May 20, 1969   WOLF-DIETER BENSINGER   3,445,058
PISTON FOR A ROTARY PISTON INTERNAL COMBUSTION ENGINE
Filed Jan. 4, 1967
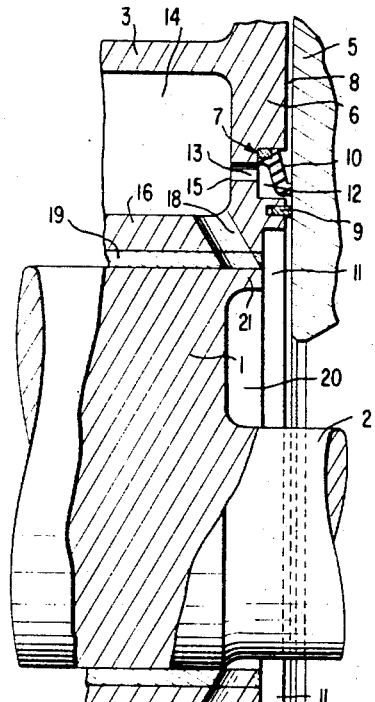
FIG.1
FIG.2
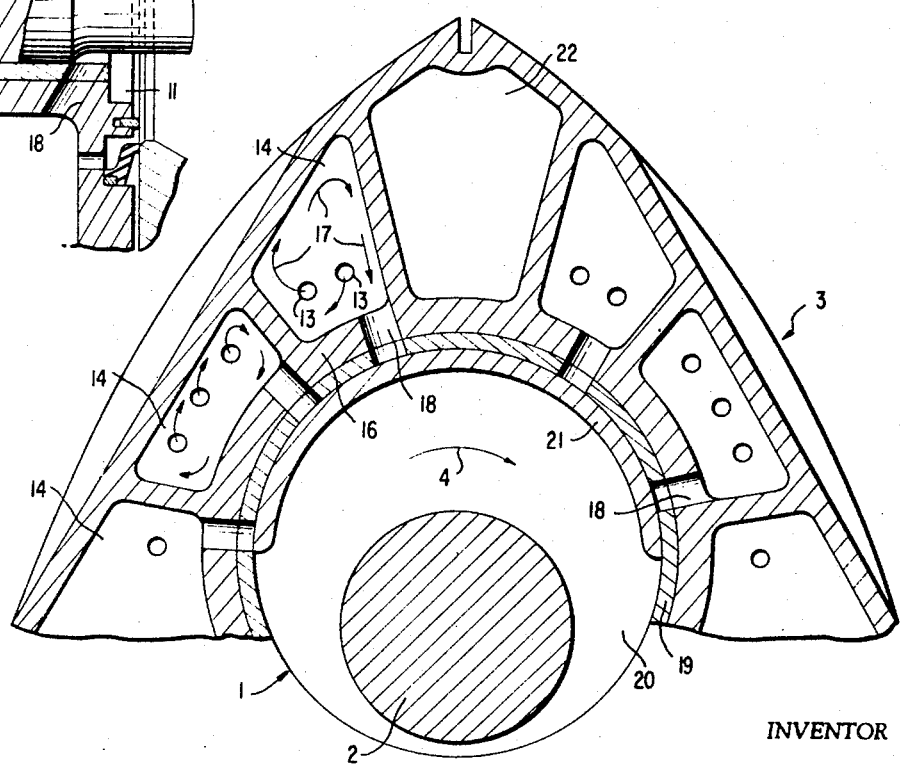
INVENTOR
WOLF-DIETER BENSINGER
BY *Dicke & Craig*
ATTORNEYS

United States Patent Office 3,445,058
Patented May 20, 1969

3,445,058
PISTON FOR A ROTARY PISTON INTERNAL COMBUSTION ENGINE
Wolf-Dieter Bensinger, Stuttgart-Riedenberg, Germany, assignor to Daimler-Benz Aktiengesellschaft, Stuttgart-Unterturkheim, Germany
Filed Jan. 4, 1967, Ser. No. 607,292
Claims priority, application Germany, Jan. 7, 1966,
D 49,092
Int. Cl. F04c *17/02;* F02b *53/00, 55/06*
U.S. Cl. 230—145                                    5 Claims

ABSTRACT OF THE DISCLOSURE

A piston for a rotary piston internal combustion engine, especially of trochoidal construction, which is provided at each of the piston end faces with at least two substantially concentrically arranged sealing rings in engagement with the lateral housing walls to seal the space between the piston end faces and adjoining lateral housing walls, and in which the annular space between two respective concentrically arranged sealing rings are in communication with chambers formed within the piston for the removal from these spaces of lubricating oil under the influence of centrifugal forces, whereby the chambers, in turn, are provided with discharge bores to return the lubriating oil from these chambers radially inwardly.

---

The present invention relates to a piston for a rotary piston internal combustion engine, especially of trochoidal construction, having inner seals arranged in the piston end walls each of which consists of at least two sealing rings arranged substantially concentrically to each other and sliding during rotation of the piston along the lateral parts of the internal combustion engine housing.

Especially with rotary piston internal combustion engines of trochoidal construction, the inner seals which act as oil seals, offer difficulties because especially at higher rotational speeds, an oil pressure forms in front of the sealing parts increasing as the square of the rotational speed. The present invention aims at eliminating the cause of these difficulties, and as solution to the underlying problems essentially consists in that the spaces between each two sealing rings of the inner seals are in communication by way of bores with chambers provided within the piston which, in turn, are connected by way of bores with spaces disposed between the end walls of the piston and the lateral parts of the housing radially inwardly of the sealing rings.

It is possible by means of the present invention to discharge lubricating oil, which collects at each inner seal between two sealing rings and which loads the outer sealing ring, in a simple manner through the piston so that the outer sealing ring is relieved and is no longer under the oil pressure. The oil circulates within the chambers provided within the piston because the centrifugal forces always act in the direction of the eccentric of the eccentric shaft whereas the piston only rotates at one-third of the rotational speed of the eccentric shaft and thus lags or trails with respect thereto. In relation to the piston, the centrifugal forces therefore rotate in the direction of rotation of the eccentric shaft and the oil can thus be discharged again out of the chambers by utilizing this effect.

According to a further advantageous construction of the present invention, the orifices of the bores, which connect the spaces between the two sealing rings with the chambers in the piston, may be arranged in the piston end walls in such a manner that they have a spacing with respect to all adjoining walls of the chambers. The inlet cross-section of the bores which connect the chambers with the spaces between the end walls of the piston and the lateral housing parts inside of the inner seals may be located in the bottom walls within an area of the chambers located forwardly in relation to the direction of rotation of the piston.

With a piston which is rotatably supported on the eccentric of an eccentric shaft, the discharge orifices of the bores beginning in the bottom walls of the chambers may be disposd in the bearing bores of the piston for the eccentric of the eccentric shaft, and the eccentric may be constructed in such a manner that it covers the orifices of those bores which are located along one half the circumference in the direction of the eccentricity of the eccentric. It is achieved thereby that with outwardly directed centrifugal forces, no lubricant can penetrate into the chambers, within the piston from the space located radially inwardly, i.e., in front of the inner seals; on the other hand, a connection exists during inwardly directed centrifugal forces between the chambers in the piston and the space in front of the inner seals so that the chambers can be emptied.

In an advantageous manner, the chambers for the reception and discharge of the lubricant may be separated from chambers, preferably arranged in the corner regions of the piston, for receiving cooling oil so that differing cooling effects can be achieved in the flanks of the piston.

Accordingly, it is an object of the present invention to provide a rotary piston for rotary piston internal combustion engines, especially of trochoidal construction which effectively eliminates the aforementioned shortcomings and drawbacks encountered with the prior art constructions.

Another object of the present invention resides in a rotary piston for rotary piston internal combustion engines in which the sealing rings located in the end faces of the piston are effectively relieved from oil pressure caused by centrifugal forces.

A further object of the present invention resides in a piston for a rotary piston internal combustion engine which not only prevents the buildup of large oil pressures within the space between two substantially concentrically arranged sealing rings located in the end faces of the piston but also permits differing cooling effects in the piston flanks of the piston.

A still further object of the present invention resides in a piston for a rotary piston internal combustion engine which is provided with an automatically controlled discharge for the lubricant from the space between two concentrically arranged sealing rings in the end faces of a piston, utilizing the alternating centrifugal forces resulting from the relative rotation of the eccentric and the piston mounted on the eccentric.

These and further objects, features and advantages of the present invention will become more obvious from the following description when taken in connection with the accompanying drawing which shows, for purposes of illustration only, one embodiment in accordance with the present invention, and wherein:

FIGURE 1 is a partial longitudinal cross-sectional view through a rotary piston internal combustion engine of trochoidal construction within the area of an inner seal thereof, and FIGURE 2 is a transverse cross-sectional view, at right angle to the piston axis, through the rotary piston of FIGURE 1.

Referring now to the drawing wherein like reference numerals are used throughout the two views to designate like parts, the piston generally designated by reference numeral 3 is arranged on the eccentric 1 of an eccentric shaft 2. The piston 3 rotates in the direction of arrow 4 (FIGURE 1) relative to the eccentric shaft 2 and to the housing of which a lateral part 5 is shown in this figure. Inner seals generally designated by reference numeral 7 are arranged in the end walls 6 of the piston 3 which are intended to prevent that lubricant coming from the bearing support of the piston 3 on the eccentric 1 and from the bearing support of eccentric shaft 2 in the lateral housing parts 5, reaches through the gaps 8 between the end walls 6 of the piston 3 and the lateral housing parts 5 radially outwardly into the working chambers of the internal combustion engine.

Each inner seal 7 consists of the inner sealing ring 9 and of the outer sealing ring 10 arranged concentrically thereto. The lubricant acts on the two sealing rings 9 and 10 which stems or comes from the space 11 located inside of the sealing ring 9 and is derived from the bearings of the eccentric shaft 2 as well as from the bearings of the piston 3 on the eccentric 1 of the eccentric shaft 2. In order that no lubricant can collect within the space 12 between the two sealing rings 9 and 10, in which the pressure increases as square of the rotational speed of the piston 3 so that sealing ring 10 is loaded very strongly, the space 12 is connected by way of bores 13 with the chambers 14 provided on the inside of the piston 3. The lubricant may thus flow off through the bores 13 into the chambers 14. The lubricant circulates within the chambers 14, in which the orifices 15 of the bores 13 are located above the bottom walls 16 and also have a spacing from the remaining adjoining walls of the chambers 14, in relation to the piston 3 in the direction of the direction of arrow 17. The lubricant is discharged out of the chambers 14 through the bores 18. The inlet cross sections of the bores 18 are disposed in the bottom walls 16 of the chambers 14 on both sides in proximity to the end walls 6 and within the forward area of the chambers 14 in relation to the direction of rotation of the piston 3. The discharge orifices of the bores 18 are located in the bearing bore of the piston 3 or at the inner surface of the bearing 19 inserted into the bearing bore of the piston and more particularly in proximity to the axial boundary of the bearing 19.

In order that no lubricant can enter into the chambers 14 through the bores 18 out of the space 11 during outwardly directed centrifugal forces and that lubricant can flow off out of the chambers 14 through the bores 18 into the space 11 during inwardly directed centrifugal forces, the end faces of the eccentric 1 are constructed in a particular manner. Once recess 20 is provided at each end face in the eccentric 1 which is so deep in the axial direction of the eccentric 1 that along one half of the eccentric circumference the orifices of the bores 18 are free or open so that the lubricant can reach the space 11 from the chambers 14, Along the other half of the circumference, and more particularly along that half which is disposed in the direction of the eccentricity of the eccentric, the recess 20 is not extended in the radial direction up to the outer boundary of the eccentric so that the cover 21 remains which covers over half the circumference of the eccentric, the orifices of the bores 18 so that no lubricant can reach the chambers 14 from the space 11.

The chambers 14 in piston 3 are separated from the chambers 22 in the corners of the piston. The chambers 22 are supplied in a conventional manner with cooling oil. Hence, differing cooling effects can be achieved over the piston flanks.

While I have shown and described one embodiment in accordance with the present invention, it is undersood that the same is not limited thereto but is susceptible of numerous changes and modifications as known to a person skilled in the art, and I therefore do not wish to be limited to the details shown and described herein, but intend to cover all such changes and modifications as are encompassed by the scope of the appended claims,

I claim:
1. A piston for a rotary piston internal combustion engine, especially of trochoidal construction, which includes inner seal means arranged in the end walls thereof, of which each inner seal means consists of at least two sealing rings gliding during rotation of the piston along the lateral parts of the internal combustion engine housing, wherein the improvement comprises chamber means formed within the piston, the spaces between each two sealing rings being operatively connected with said chamber means by way of bore means provided in the piston, and discharge bore means operatively connecting said chamber means with the spaces located inside of the inner seal means and formed between the end walls of the piston and the lateral parts of the housing, the discharge orifices of the bore means which connect the spaces between two sealing rings with the chamber means in the piston being arranged in the end walls in such a manner that they have a spacing with respect to all adjoining walls of the chamber means, the inlet cross section of the discharge bore means which connect the chamber means with the spaces between the end walls of the piston and the lateral housing parts inside of the inner seal means being located in the bottom walls of the chamber means within a forward area thereof in relation to the direction of rotation of the piston, the piston being supported on the eccentric of an eccentric shaft, and the discharge orifices of the discharge bore means, beginning in the bottom walls of the chamber means, being located in the bearing bore of the piston for the eccentric of the eccentric shaft and the eccentric being so constructed that it covers those discharge bore means which are disposed along approximately half of the circumference in the direction of the eccentricity.

2. A piston according to claim 1, wherein said chamber means for receiving and discharging lubricant are separate from further chamber means provided within said piston for cooling oil.

3. A piston according to claim 2, wherein the chamber means for the cooling oil are located in the corner regions of the piston.

4. A piston for a rotary piston internal combustion engine, especially of trochoidal construction, which includes inner seal means arranged in the end walls thereof, of which each inner seal means consists of at least two sealing rings gliding during rotation of the piston along the lateral parts of the internal combustion engine housing, wherein the improvement comprises chamber means formed within the piston, the spaces between each two sealing rings being operatively connected with said chamber means by way of bore means provided in the piston, and discharge bore means operatively connecting said chamber means with the spaces located inside of the inner seal means and formed between the end walls of the piston and the lateral parts of the housing, the inlet cross section of the discharge bore means which connect the chamber means with the spaces between the end walls of the piston and the lateral housing parts inside of the inner seal means being located in the bottom walls of the chamber means within a forward area thereof in relation to the direction of rotation of the piston, the piston being supported on the eccentric of an eccentric shaft, and the discharge orifices of the discharge bore means, beginning in the bottom walls of the chamber means, being located in the bearing bore of the piston for the eccentric of the eccentric shaft and the eccentric being so constructed that it covers those discharge bore means which are disposed along approximately half of the circumference in the direction of the eccentricity.

5. A piston for a rotary piston internal combustion engine, especially of trochoidal construction, which includes inner seal means arranged in the end walls thereof, of which each inner seal means consists of at least two sealing rings gliding during rotation of the piston along the lateral parts of the internal combustion engine housing, wherein the improvement comprises chamber means formed within the piston, the spaces between each two sealing rings being operatively connected with said chamber means by way of bore means provided in the piston, and discharge bore means operatively connecting said chamber means with the spaces located inside of the inner seal means and formed between the end walls of the piston and the lateral parts of the housing, the piston being supported on the eccentric of an eccentric shaft, the discharge orifices of the discharge bore means, beginning in the bottom walls of the chamber means, being located in the bearing bore of the piston for the eccentric of the eccentric shaft, and the eccentric including means for covering those discharge bore means which are disposed along approximately half of the circumference in the direction of the eccentricity.

References Cited

UNITED STATES PATENTS

| | | |
|---|---|---|
| 3,091,386 | 5/1963 | Paschke. |
| 3,265,045 | 8/1966 | Bensinger et al. |
| 3,289,651 | 12/1966 | Jinno _____ 230—145 XR |

FOREIGN PATENTS

| | | |
|---|---|---|
| 893,938 | 4/1962 | Great Britain. |
| 398,178 | 2/1966 | Switzerland. |

ROBERT M. WALKER, *Primary Examiner.*

W. J. GOODLIN, *Assistant Examiner.*

U.S. Cl. X.R.

123—8